E. GRAY, DEC'D,
D. M. GRAY, EXECUTRIX.
TRANSMISSION OF SOUND.
APPLICATION FILED APR. 15, 1901.

989,250.

Patented Apr. 11, 1911.

E. GRAY, DEC'D.
D. M. GRAY, EXECUTRIX.
TRANSMISSION OF SOUND.
APPLICATION FILED APR. 15, 1901.

989,250.

Patented Apr. 11, 1911.

UNITED STATES PATENT OFFICE.

DELIA M. GRAY, OF HIGHLAND PARK, ILLINOIS, EXECUTRIX OF ELISHA GRAY, DECEASED, ASSIGNOR, BY MESNE ASSIGNMENTS, TO SUBMARINE SIGNAL COMPANY, A CORPORATION OF MAINE.

TRANSMISSION OF SOUND.

989,250.      Specification of Letters Patent.      Patented Apr. 11, 1911.

Application filed April 15, 1901. Serial No. 55,935.

*To all whom it may concern:*

Be it known that ELISHA GRAY, of Highland Park, in the county of Lake and State of Illinois, did invent a new and useful Improvement in the Transmission of Sound, of which the following is a full, clear, and exact description, reference being had to the accompanying drawings, forming a part of this specification, in explaining its nature.

The invention herein described is adapted to what may be termed long distance transmission of sound in water. In some respects it may be considered as an improvement upon the invention described in the patent to Elisha Gray and Arthur J. Mundy, dated November 7, 1899, No. 636,519, for transmission of sound, and in other respects it is not an improvement upon said invention, but an invention of a different character. The invention of said Letters Patent is adapted to transmit sound of a peculiar character produced in a peculiar way in water for relatively short distances. Experiments have shown that with the apparatus described in said patent it is ineffective for relatively long distances, that is, distances exceeding three miles, and the commercial use of said patented invention is therefore restricted as ordinary commercial purposes for which that invention and the present invention were designed require a much greater range than this, and experiments with the present invention have shown a sound transmission capacity of twelve miles between the transmitting station and the receiving point. This important advance in the art it is believed is due to two causes; the first relates to the sound-producing device, meaning by that the device itself and the means by which it is sounded, and the second to the receiving and transmitting apparatus, which receives or takes up the sound from the water and delivers it at any desired point. Before describing these parts of the improved and new system it will be well to say in what it further consists and how it may be used.

The object of the invention is the transmission through water of signals from a station to a moving object or other station more or less remote from it and in an intelligible way and for the purpose of warning or transmitting information.

The sound-producing station is usually in an exposed and often times an inaccessible position, in deep water off a dangerous point or reef or at the mouth of a river or harbor where it is if not impossible certainly not feasible to locate an operating station. It is essential that the mechanical means used for operating the sound-producing instrumentality should be associated with it and beneath the water. There is in the complete system, first, a station on shore or above the water, generally located at a considerable distance from the sound-transmitting station and which contains means for actuating the sound-producing device at will and may contain the means for providing it with power; second, submerged stationary, sound-producing devices connected with the shore station, and third, a sound-receiving and transmitting apparatus submerged in water at a distance from the sound-producing apparatus and generally variable in position in relation to it. These three elements, however, may be differently combined and associated, in that the first and second may be combined and movable in the water and the third element may be held stationary in the water; or the sound-producing station may also have a receiver and the receiving point may also have a sound-producer.

The form of sound or impulse-producing device which experiment has shown to the inventor to be the most desirable one is that obtained by a large naked bell of the usual type, (by naked is meant having its outer surface in physical contact with the water so that its vibrations are communicated directly to the water) submerged deeply in deep water, having no sound-reflecting surfaces or bodies immediately at hand, and forcibly struck at will by a power-operated hammer.

That sufficient power may be secured for the operation of the hammer it has been found desirable that the hammer-actuating mechanism also should be submerged with the bell and held in such close relation therewith that the hammer may be actuated to deliver heavy, single, intermittent blows upon the bell. Not only this, but the power must be of such a form as to be absolutely controllable at a distance and for this reason there has been employed as a means for actuating the hammer a powerful electro motor contained in a water-tight case and comprising a powerful magnet or magnets connected with the bell hammer by intermediate devices preferably in the form of levers. The magnet or magnets are energized by an electric current originated by a dynamo at the shore station or any other convenient point and deënergized at will at the shore station, the cable extending into or through the shore station and being there connected with means by which the electric current for energizing the magnets is controlled.

It has been found by experiment that not only should the bell be heavy, should be exposed to the water, should be struck forcibly by the hammer and should be deeply submerged, but it is desirable that it should also have a note that shall be as free from opposing or clashing overtones or other sound-killing effects as possible, and it has been ascertained by the inventor that the sounds or impulses which have the greatest carrying force, that is, which will carry the greatest distance from the sounding station are those which are of the purest character and produced within certain limits of vibration, that is, other things being equal, bells which sound a note having vibrations between 360 a second and 1440 a second are probably the best adapted for producing sound signals or impulses of large carrying capacity. Deep water receiving the vibrations of such a bell, so operated, has the capacity to transmit or carry the impulses or vibrations of the sound in a circle continually increasing in diameter and in height for relatively great distances from the sound-originating means, one experiment demonstrating a transmitting capacity of twelve miles in one direction from the bell and the entire sound field indicated by this would exceed that of a circular area twenty-four miles in diameter. The inventor therefore believes that he is the first to discover a perfect means for transmitting sound signals long distances by water.

Another part of his invention, which he has demonstrated by experiments, consists in the sound or impulse-receiving instrumentality. This part of the new system and of the invention is based upon the fact that water unlike an electric wire conductor receives the sound vibrations or impulses produced at a central point and transmits said vibrations from said point in a rapidly widening circle which also increases in height as it recedes and which, of course, decreases in energy as its distance increases, producing numberless points at which it may be received by a receiving apparatus, that is, while there may be but a single transmitting point, possible receiving points are limitless and the same signal may therefore be received by receiving devices upon all sides of the transmitting point, and which may be separated, as has been shown above by distances of at least twenty-four miles, the transmitting vibrations advancing on a continually widening zone or circle which may be tapped at any point by a receiver. The energy of the widening zone or circle of sound vibrations becomes less as it recedes from the initial station or center, and its effectiveness in actuating a single receiver satisfactorily correspondingly diminishes. (If, however, instead of employing a single receiving instrumentality for receiving, when so diminished, the sound vibrations, there shall be used a number of receivers separated from each other, but adapted to simultaneously receive vibrations at different points from the same traveling sound zone or wave, and to concentrate or focus them, something of a reverse effect is secured in that faint vibrations thus brought together and finally combined in a single receiver, due to the concentration of a number of individual transmitters each acting independently of the others to receive the sound vibrations from some part of the passing sound zone,) and the inventor has discovered by experiment that where a single receiver will not act at a considerable distance from the originating station to deliver a well defined audible signal, a number of receivers acting conjointly at a much greater distance from the said station will receive combine and deliver a well defined and sufficiently audible signal.

From this description of the inventor's system it will appear that a new method of sound signaling by water has been devised by the described conjunction and relation of the special sound-producing apparatus to the special sound-receiving apparatus.

The invention will now be described in connection with the drawings, forming a part of the specification in which—

Figure 1:
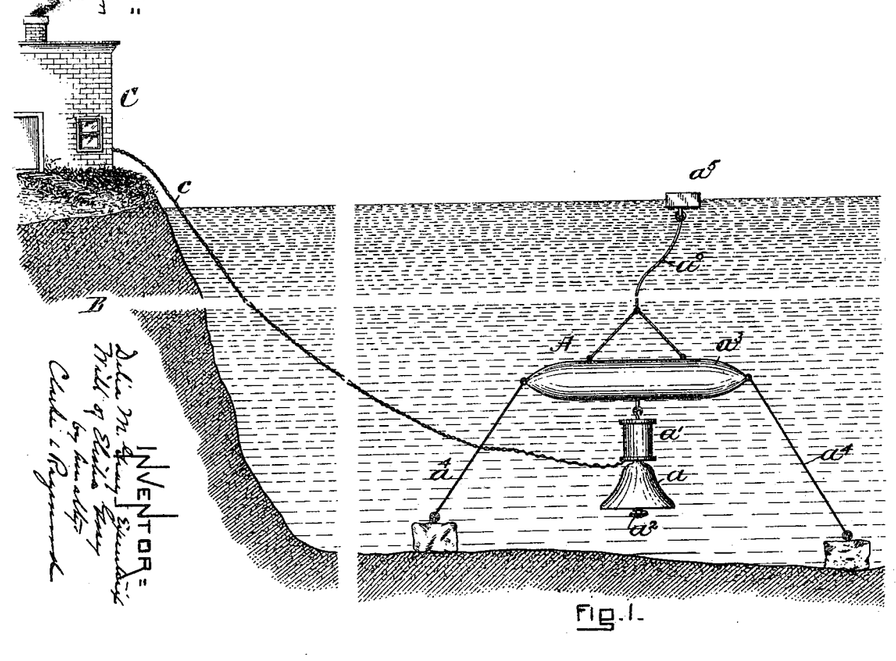
Figure 1 is a view illustrating in a general way the apparatus employed.
Figure 2:
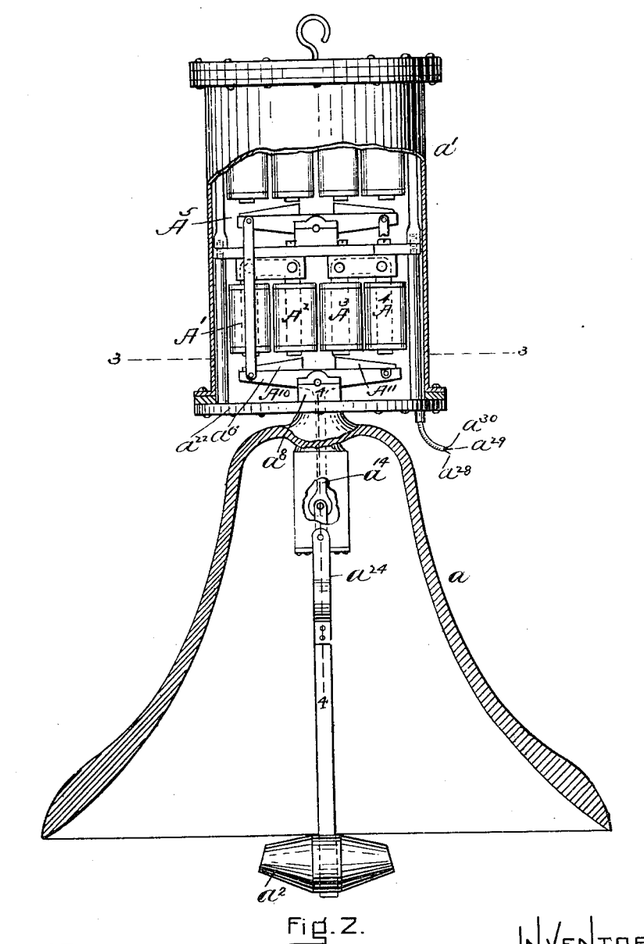
Fig. 2 is a view, enlarged, to represent the sound bell, its hammer and means for actuating it.
Figure 3:
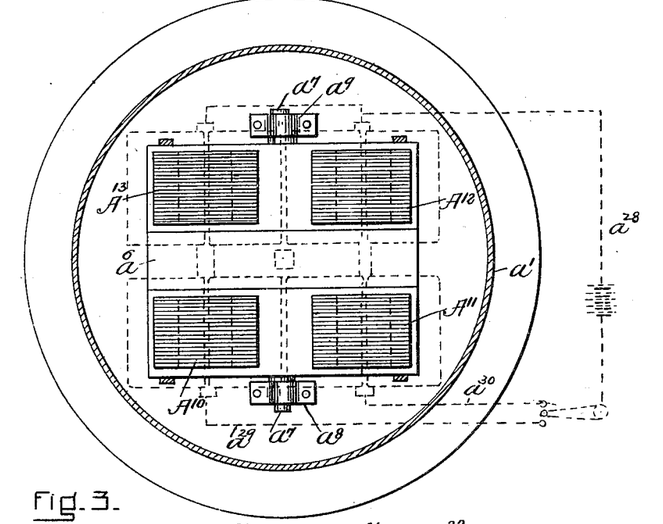
Fig. 3 is a view in horizontal section, enlarged, upon the dotted line 3—3 of Fig. 2.
Figure 4:
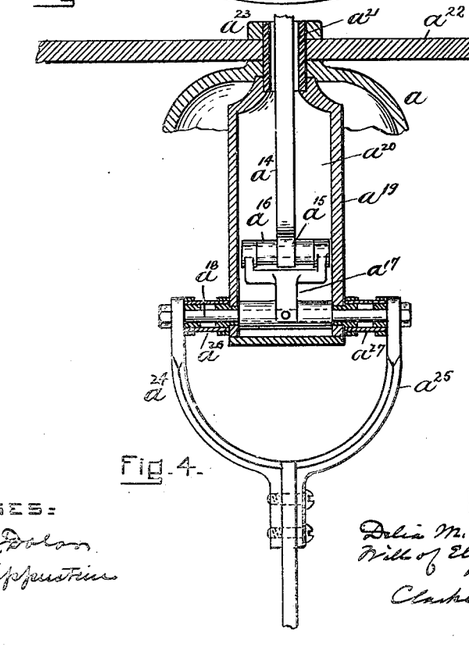
Fig. 4 is a view in vertical section, enlarged, upon the dotted line 4—4 of Fig. 2.
Figure 5:
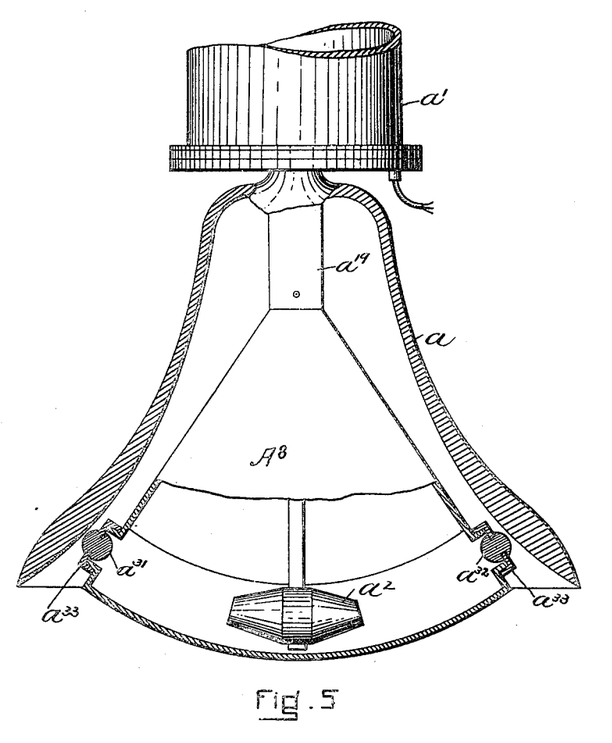
Fig. 5 is a view of the sound bell and hammer, showing a modification to which reference is hereinafter made.

Referring to Fig. 1 of the drawings:—A represents conventionally a signal station, B the shore, C the operating station upon the shore, D a vessel and E a multiple receiver suspended from a vessel. The signal station is in relatively deep water and sufficiently removed from submerged sound-reflecting surfaces not to be affected by them. It is desirable that the sound bell $a$ at the signal station shall be suspended at least from 15 to 25 feet below the surface of the water. The signal station is connected with the operating station C by the cable $c$. The distance between the two is immaterial. It may be a short distance or it may be a number of miles. The operating station contains the means or is connected with the means for energizing the electro motor which actuates the bell hammer and which is contained in a water-tight case $a^1$, which is submerged with the bell and has operative relation to it and its hammer $a^2$. The motor, motor case and bell may be held submerged by any suitable suspending means. There is represented in the drawing as one form of such means a submerged buoyant float $a^3$ anchored to the bottom by anchoring chains $a^4$, which float or buoy is submerged to any desired extent, but has sufficient buoyancy to hold the bell, motor and case suspended from it. The submerged float may also have an indicating buoy $a^5$ to float on the surface of the water connected with it by a chain $a^6$. Any other suitable means for suspending the bell, its motor and case may be used. The motor and devices connecting it with the bell hammer are shown in Figs. 2, 3 and 4. It will be understood that the bell $a$ is in physical contact with the water in which it is submerged so that its vibrations will be communicated directly to it. The bell hammer $a^2$ may be in physical contact with the water as represented in Figs. 1 and 2 or it may be contained in a water-tight case as represented in Fig. 5. The hammer as shown is contained in the cavity of the bell and is forcibly swung by the motor in this cavity to strike the sound rim of the bell, but it may be exterior to the bell if desired.

There is represented as one means for actuating the bell the electric motor contained in the case $a^1$ (see Figs. 2, 3 and 4) where $A^1$, $A^2$, $A^3$ and $A^4$ represent stationary magnets. Mounted in the chamber $A^5$ of the case $a^1$ is a cast iron rocker $A^6$, shown in plan in Fig. 3. It has trunnions $a^7$ mounted in the bearings $a^8$, $a^9$. Clamped within the frame of the rocker are four laminated armatures $a^{10}$, $a^{11}$ and $a^{12}$, $a^{13}$. Their laminations are laid together so that their edges form the faces of the armatures that are presented to the poles of the magnets. There are four magnets the poles of which present themselves to the armatures and which face downward over the forward faces of the armatures in the position shown in Fig. 2. Fastened to the center of the rocker and extending downward at right angles to it is an arm or lever $a^{14}$ having a forked lower end $a^{15}$ which engages with a roller $a^{16}$ (see Fig. 4) on the end of a short arm $a^{17}$ which is fastened to a shaft $a^{18}$, having a bearing in the air-tight box $a^{19}$ located within the cavity of the bell. The chamber $a^{20}$ of this box $a^{19}$ communicates with the chamber of the case $a^6$ through a hole in the connecting tube $a^{21}$. The tube is threaded at both ends. The lower end is screwed firmly into the box while the upper end passes upward through the crown of the bell and through the plate $a^{22}$ which forms the lower end of the case. The bell is seated inside to receive the upper end of the box. A heavy nut $a^{23}$ is screwed on to the upper end of the tube (see Fig. 4) down upon the plate $a^{22}$ to clamp the case and box together and at the same time secure the bell firmly between them. The arm or lever which is secured to the rocker passes down through the hole in the tube to the chamber of the box where its fork straddles the roller. Secured to the outer end of the rock shaft are two downward-extending, inwardly bent arms $a^{24}$, $a^{25}$. The lower ends of these arms meet at a point directly under the center of the box and are there secured to the arm of the bell hammer.

The rock shaft may be packed in any desired way. There is shown one way which comprises the rubber tubes $a^{26}$, $a^{27}$, through which the rock shaft passes and which have their outer ends attached to the shaft and their inner ends to the box. When the bell hammer moves there will be a torsional strain upon the tubes according to the direction in which the hammer moves. The hammer and its arm are shaped to cut through the water with the least resistance.

The number of rockers and magnets may be multiplied or used in series if desired and in Fig. 2 I have represented the employment of a second rocker with its armatures supported upon trunnions within the chamber of the case and connected with the lower rocker by connecting links at each corner. There are also shown magnets for operating the second rocker. The magnets are connected electrically and when charged act upon the armatures of both rockers and cause them to throw the bell hammer with great force against the bell, one group serving, when energized, to throw the rockers and swing bell hammer in one direction against the bell and the other group, when energized, serving to throw the rockers and swing the bell hammer in the opposite direction against the bell.

The wire $a^{28}$ is common to both groups of magnets and is connected to one pole of the source of electrical power. The wire $a^{29}$ is connected to one group of magnets and the wire $a^{30}$ is connected to the other group of magnets by means of a switch or commutator, worked either by hand or automatically. The electrical power may thus be thrown from one group of magnets to the other, causing strokes of the bell in any order and predetermined, or otherwise.

In Fig. 5 the bell hammer is represented as inclosed in an air-tight chamber contained within the cavity of the bell and to the walls of which chamber there are yieldingly secured metal transferers to receive the blow of the bell hammer and transmit its impulses to the bell. In said drawing $A^8$ is a water-tight case forming the bell hammer chamber. It is suspended from the box and opens into it. It may be made of metal or any other suitable material and it is of a size to permit the oscillation of the bell hammer. It has in the line of oscillation of the hammer, in close contact to the bell, the transferers $a^{31}$, $a^{32}$, which preferably are of metal and which are adapted to be struck by the bell hammer. They are secured to the wall of the chamber by resilient holders $a^{33}$, preferably of rubber and provided with cylindrical sections to fit upon integral sleeves extending from the wall to which they are attached. The transferers are thus held adjacent to the bell so that when struck by the hammer they deliver its blow to the surface of the bell, but are then immediately returned from its surface by their holders. Substantially this construction of motor, naked hammer and bell have been demonstrated by experiment to have a wonderful effect in producing sound vibrations which impart to the water with which the bell is directly in contact radiating vibrations of great carrying or transmitting power and value. This, as has already been intimated, it is thought is due to the fact that the bell was in physical contact with the water; that it was deeply submerged; that it was very forcibly struck; that the sound of the bell did not set up choking or disturbing vibrations to any considerable extent, and that there were no sound-reflecting surfaces adjacent to the bell. This part of the invention, however, is not confined to the structure described, as any equivalents for the same, which will produce the results mentioned, may be employed.

There will now be described certain forms of receivers useful in this system. They are not herein claimed as they form the subject matter of a divisional application hereof.

Figure 7:
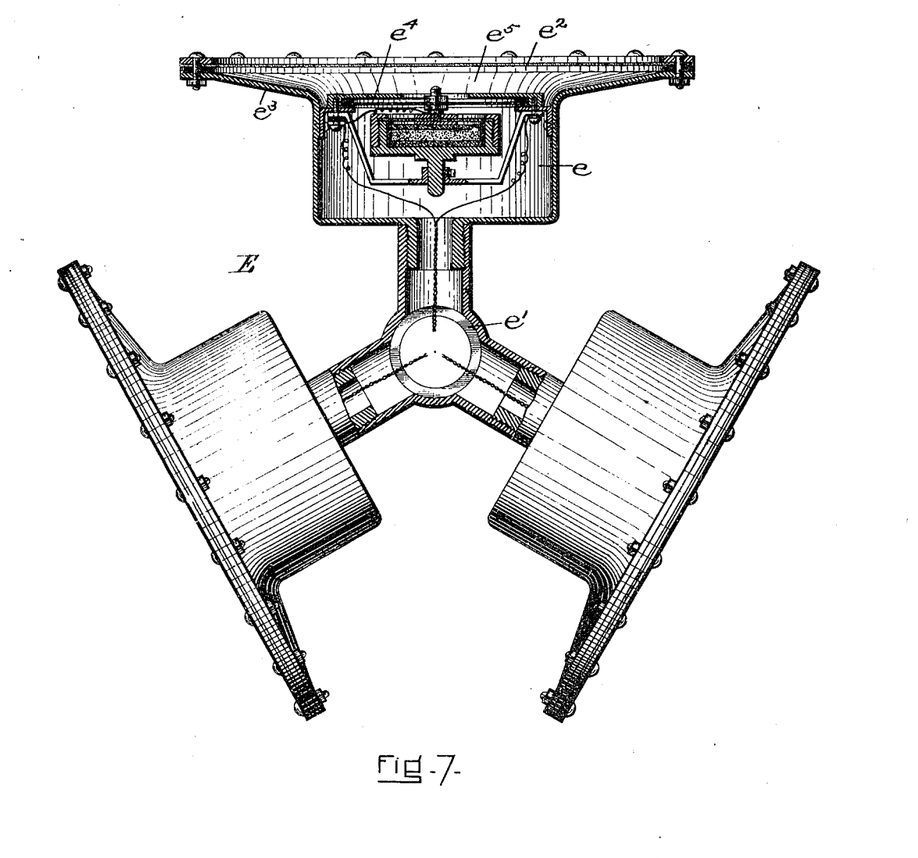
Fig. 7 is a view thereof, enlarged, upon the dotted line 7—7 of Fig. 6, also showing a portion of one of the receivers broken out to illustrate its interior construction.
Figure 8:
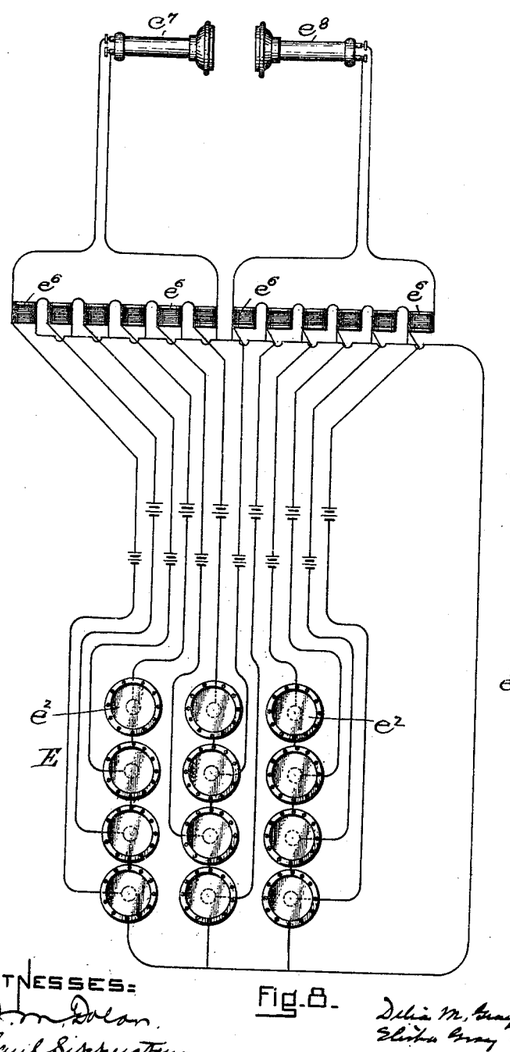
Fig. 8 is a diagrammatic view, further illustrating the multiple receiver.

The multiple receiver E is represented as deeply submerged in water and as suspended from a vessel, as represented in Fig. 1 and, while it is desirable when used for receiving sound impulses transmitted by water when the distances are long that it be deeply submerged, it is not always essential that it should be. The multiple receiver may also be employed for receiving and transmitting sound vibrations in the air. It comprises a series of chambers $e$ of any desired size—the side and back walls of which may be of any suitable material—preferably held or supported by a common holder or support $e^1$. One side of the chamber, preferably its face, consists of a taut non-electric diaphragm $e^2$ attached by its edge to the wall of the chamber in any desired way. In Fig. 7 the chamber wall is shown as flaring outward at $e^3$ and the diaphragm is shown as attached to the outer edge of its flaring part. The diaphragm may be made of any material capable of vibration. It has one surface in contact with the water and one in contact with the air of the chamber and it is vibrated by the action of the sound waves upon it. All the chambers $e$ of the multiple receiver are air-tight when used for submarine purposes and in each chamber there is arranged a sound transmitter which may be like the transmitting mechanism of an ordinary carbon button telephone transmitter. In Fig. 7 such a carbon button telephone transmitter is shown. It is fastened to the wall of the chamber with its diaphragm $e^4$ facing the non-electric diaphragm $e^2$ and parallel with it and separated from it by a narrow air space $e^5$. It is not necessary to further describe this sound transmitter, and the invention is not confined to any especial form of sound transmitter. The sound transmitter in each chamber is connected by a suitable primary circuit with one of the induction coils $e^6$ (see Fig. 8). There is an induction coil for each sound transmitter and connected with each by an individual primary circuit and these coils are represented in Fig. 8 as arranged in two series of equal number. Each series is connected with a telephone receiver by a secondary circuit which includes all the coils of a series, the coils being connected with each other in series.

The two telephone receivers by which the sound impulses are finally delivered to the ears of a hearer are lettered respectively $e^7$, $e^8$. Each primary circuit includes an induction coil, an electric battery in the circuit, a telephone transmitter and the circuit. The winding of all the induction coils is in the same direction and all the electric batteries should be arranged to send their current in the same direction through the coils. All the transmitters are connected with the single main return wire which is also connected with the coils. The wires which connect the transmitters with the coils are assembled in a cable $e^9$ and the cable may be the means for suspending the receiver in the water from the vessel or other support.

The two series of coils $e^6$ may be located on the vessel or in any other place or at any distance from the receivers, and the telephone receivers $e^7$, $e^8$, may be at any convenient place in the vessel or in any other place or at any desired distance from the coils. Two receivers are represented and both may be used by the hearer, or they may be used by two persons at the same time; only one receiver or more than two may be employed if desired.

The connection of a number of transmitters with induction coils and the inclusion of a number of said coils so connected with separate transmitters in a circuit, including a receiver, focuses, increases or intensifies the sound impulses received by the receiver and delivered by the transmitter. When each receiver circuit includes the same number of coils there will be no difference in the intensity of the sound signals delivered by each receiver, but if the number of coils with each receiver is varied then the intensity of the sound impulses delivered by the receivers will be correspondingly varied.

Figure 6:
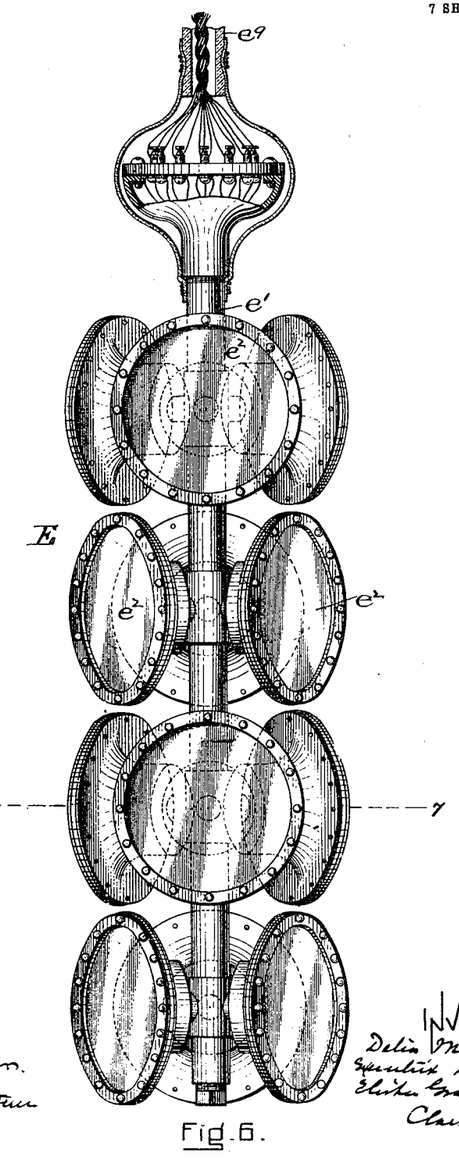
Fig. 6 is a view in elevation of a multiple sound-receiver.

The chamber $e$ and non-electric diaphragm may face in different directions, those represented in Figs. 6 and 7 are arranged to face in three directions. By this it will be understood that the taut or receiving diaphragms are disposed so that some face in one direction, others in another direction and the remainder in a third direction. When used in the water to receive sound impulses transferred by it, the diaphragms receive the vibrations and set in vibration the air contained in the chambers and the vibration of the air in the chambers in turn causes the diaphragms of the telephone transmitters to be vibrated, thereby actuating the transmitting devices and setting up an impulse current in the electric circuits, which is repeated on the diaphragms of the receivers $e^7$, $e^8$.

While one receiver (and there is meant by this a single receiving diaphragm, transmitter, electric circuit and receiver) will answer for short distances, for longer distances it is desirable to employ two or more in circuit with one receiver, and it may be stated as a rule that the greater the distance from their source it is desired to receive the sound impulses the larger the number of individual receivers in circuit with a single receiver should be employed. This is because of the diffusion and the weakening of the sound impulses or waves as they recede from their source; by multiplying the number of receivers and combining or focusing their action the individual, weakened impulses which each receives are so strengthened at the focusing point as to make distinctly audible what otherwise might be uncertain; in other words, each one of the receivers may be likened to a single ear having definite sound-receiving properties, and the group of receivers may be considered a series of individual ears of the same power or capacity. The connection of these ears with a common receiving point provides at that point the sum of the value of each, so that if two ears are used substantially twice the effect of a single one is obtained; if five, five times the effect of a single one, and so on, each ear taking its impulses from a different section of the sound wave common to all.

While the different receivers or ears are represented in the figures as somewhat closely assembled and pointing in different directions, it is not meant that the invention should be limited in these respects, as they may be arranged much farther apart and may point only in one direction. Neither is it intended that the invention shall be confined to a structure in which taut diaphragms act to receive the sound impulses, for any instrumentality which will receive such impulses and by its own vibration cause or set up vibrations in the diaphragm of one or more telephone transmitters adjacent thereto or to air interposed between it and telephone transmitters, may be used, and in this connection it should be noted that the shell or frame of a vessel may constitute a receiving diaphragm for taking impulses from sound waves and that the telephone transmitters may be arranged with respect to the said shell or frame to take up its vibrations and transmit them to a central and common delivery point. It should be further noted that the multiple receiving and transmitting devices, associated to separately or individually receive sound impulses of any kind and to transmit and combine them at a central point or station, may be used in air and for any purpose where it is desired to receive separate sound impulses, whether faint or otherwise, and combine them by aggregating them at a single station.

By experiment in deep sea water it has been found possible by means of the multiple receiver described, to plainly hear sound signals or impulses transmitted by the water at a point twelve miles from their source.

Figure 9:
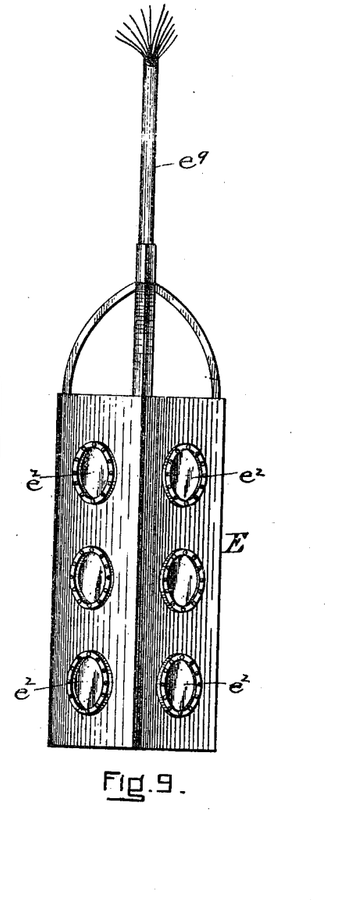
Fig. 9 is a view in elevation, showing a modified form thereof.

In Figs. 6 and 7 the individual receivers are represented as exposed to the water upon all sides, the taut diaphragms being in forward and exposed positions. In Fig. 9 the non-electric diaphragms are represented as arranged in the sides of a box-like structure, having a single chamber for all the said diaphragms.

The advantages of the invention are apparent and do not need further explanation. The uses to which it may be put are many and very important. No successful means prior to this invention has been devised for signaling at all times of the day and night and under all conditions of weather and temperature from shore to vessel or vice versa or from vessel to vessel. All signals are of relatively short range, uncertain and unreliable. Artificial light signals useful at night only when the weather is clear, while wireless telegraphy alone requires too fine adjustment and apparatus for ordinary every day protective or commercial uses.

While the induction coils of the primary circuits are represented as having a single return wire to the transmitters, it will be understood, of course, that each induction coil may have an individual return wire to its transmitter. Likewise there is shown in the drawing a battery in each transmitter circuit. This is only conventional, however, and a single battery for all the circuits may be located in the common return wire which then, of course, forms a portion of all the transmitter circuits. The telephone receiver instead of being connected with the induction coils in series may be connected with the induction coils in multiple. The telephone receiver may be connected with the induction coils in series of two or more and in multiple with two or more series. Where two telephone receivers are used all the induction coils may be in series and the telephone receivers connected in series in the same circuit. The induction coils may also be in series and the telephone receivers in multiple with the same series of induction coils. These variations are named as equivalents both in the specification and in the claims.

The invention being thus fully described, what is claimed and what is desired to be secured by Letters Patent of the United States is as follows:—

1. In a system for the transmission of sound by water, the combination of a means for producing sound waves of high carrying power in water, comprising a submerged sound-producing instrumentality of capacity for large initial energy all the vibrating portions whereof are in physical contact with the water, a striker and means for operating said striker to deliver upon said sound-producing instrumentality forcible power-driven blows, a watertight casing inclosing said striker-operating means, and a sound receiver for receiving from the water the sounds communicated to the water by said sound-producing instrumentality.

2. In a system for the transmission of sound by water, the combination with a common receiver of a means for producing sound waves in water with a submerged multiple sound receiver and transmitter, comprising a group of independent transmitters adapted simultaneously to receive and continuously to transmit sound waves originating at the same source to said common receiver.

3. The combination of a means of producing sound waves in water, means located below the surface of the water for receiving from the water and transmitting the vibrations of said sound waves and means for intensifying and delivering them, the same comprising a number of individual electric receivers and transmitters adapted to individually receive sound impulses from different sections of the same sound wave and to simultaneously transmit them, and a common receiver with which said individual receivers and transmitters are electrically connected and by means of which the sound impulses received by them are accumulated, associated and intensified.

4. In a system for the transmission of sound, a means for producing sound waves and a means for receiving sound, comprising a number of independent submerged sound receivers adapted to receive impulses from different parts of the same sound wave, and a sound-transmitting device for each receiver adapted to transmit the sound impulses from the receivers to a focuser or combiner, and said sound focuser or combiner.

5. In a system for the transmission of sound by water, a means of producing sound waves in water of high power, large initial energy, of suitable tone and at will and means for receiving said sound impulses from the water and transmitting them to a common receiving point, comprising a number of submerged independent sound-receiving diaphragms or surfaces submerged in whole or in part in the water for receiving different parts of the same sound wave, an electric sound transmitter associated with each of said diaphragms or surfaces for receiving the sound impulses thereof and transmitting them, and a common focusing or receiving point, having a receiver with which the said individual transmitters are commonly connected to focus, associate and intensify the sound impulses which they receive.

6. In a system for the transmission of sound by water, a means for producing sound waves under water and a means for receiving such sound waves located beneath the surface of the water comprising a plurality of sound receivers located about a common axis, said means being adapted to receive sound from all directions and transmit them to a common receiver, in combination with said common receiver.

DELIA M. GRAY,
*Executrix of the estate of Elisha Gray, deceased.*

Witnesses:
HENRIETTE SCHWARTZ,
D. M. ERTHINE.